(12) United States Patent
Niguès et al.

(10) Patent No.: US 11,668,729 B2
(45) Date of Patent: Jun. 6, 2023

(54) ATOMIC FORCE MICROSCOPE

(71) Applicants: Paris Sciences et Lettres, Paris (FR); Centre National de la Recherche Scientifique (CNRS), Paris (FR); Sorbonne Universite, Paris (FR); Université de Paris, Paris (FR)

(72) Inventors: Antoine Niguès, Paris (FR); Alessandro Siria, Paris (FR)

(73) Assignees: Paris Sciences et Lettres; Centre National de la Recherche Scientifique (CNRS); Sorbonne Universite; Université Paris Cité

( * ) Notice: Subject to any disclaimer, the term of this patent is extended or adjusted under 35 U.S.C. 154(b) by 0 days.

(21) Appl. No.: 17/627,239

(22) PCT Filed: Jul. 16, 2020

(86) PCT No.: PCT/EP2020/070156
§ 371 (c)(1),
(2) Date: Jan. 14, 2022

(87) PCT Pub. No.: WO2021/009290
PCT Pub. Date: Jan. 21, 2021

(65) Prior Publication Data
US 2022/0236301 A1 Jul. 28, 2022

(30) Foreign Application Priority Data
Jul. 16, 2019 (FR) ...................................... 1908027

(51) Int. Cl.
*G01Q 30/20* (2010.01)
*G01Q 30/14* (2010.01)

(52) U.S. Cl.
CPC ............. *G01Q 30/20* (2013.01); *G01Q 30/14* (2013.01)

(58) Field of Classification Search
CPC ............................... G01Q 30/20; G01Q 30/14
(Continued)

(56) References Cited

U.S. PATENT DOCUMENTS 6,559,926 B2 * 5/2003 Yamaguchi ............ G03B 27/42
355/53
8,393,009 B2 3/2013 Giessibl
(Continued)

FOREIGN PATENT DOCUMENTS

DE 19633546 A1 2/1998
FR 2887986 A1 1/2007

OTHER PUBLICATIONS

Canale, L. et al., "MicroMegascope" Nanotechnology, May 2018, pp. 1-8, vol. 29, No. 35.
(Continued)

*Primary Examiner* — Nicole M Ippolito
(74) *Attorney, Agent, or Firm* — Lerner David LLP

(57) ABSTRACT

The present invention relates to an atomic force microscope for evaluating a surface of a sample, comprising a sample holder, having a first zone suitable for receiving the sample mounted in a stationary manner, a probe having a tip able to be positioned facing the surface of the sample, the microscope being configured to allow an adjustment of a position of the tip relative to the surface, and a support, the sample holder having at least one second zone, separate from the first zone and stationary relative to the support, the sample holder being deformable so as to allow a relative movement of the first zone with respect to the second zone, and the microscope comprising a detector able to detect a movement of the first zone relative to the second zone.

25 Claims, 3 Drawing Sheets

(58) Field of Classification Search
USPC .................................................... 850/18, 33
See application file for complete search history.

(56) References Cited

U.S. PATENT DOCUMENTS

| | | |
|---|---|---|
| 2006/0182004 A1* | 8/2006 | Maeda ................... B82Y 10/00 |
| 2007/0214864 A1 | 9/2007 | Proksch |
| 2007/0222456 A1* | 9/2007 | Kaszuba ............ G01R 1/06705 |
| | | 324/555 |
| 2008/0295583 A1 | 12/2008 | Giessibl |
| 2009/0027690 A1* | 1/2009 | Fukuzawa .............. B82Y 35/00 |
| | | 356/600 |
| 2011/0307979 A1 | 12/2011 | Kobayashi et al. |
| 2012/0131704 A1 | 5/2012 | Giessibl |

OTHER PUBLICATIONS

French Preliminary Search Report for Application No. FR 1908027 dated Apr. 8, 2020, 2 pages.
Giessibl, F. J. et al., "Comparison of force sensors for atomic force microscopy based on quartz tuning forks and length-extensional resonators" Physical Review B, Sep. 2011, pp. 1-15, vol. 84, No. 12, American Physical Society.
Green, J. D. et al., "Microfabricated tip arrays for improving force measurements" Applied Physics Letters, Mar. 1999, pp. 1489-1491, vol. 74, No. 10, American Institute of Physics. XP012022181.
International Search Report including Written Opinion for Application No. PCT/EP2020/070156 dated Oct. 5, 2020, pp. 1-15.
Stowe, T. D. et al., "Attonewton force detection using ultrathin silicon cantilevers" Applied Physics Letters, Jul. 1997, pp. 288-290, vol. 71, No. 2, American Institute of Physics.

* cited by examiner

ATOMIC FORCE MICROSCOPE

CROSS-REFERENCE TO RELATED APPLICATIONS

The present application is a national phase entry under 35 U.S.C. § 371 of International Application No. PCT/EP2020/070156 filed Jul. 16, 2020, which claims priority from French Application No. 1908027, filed Jul. 16, 2019, all of which are hereby incorporated herein by reference.

FIELD OF THE INVENTION

The present invention relates to a microscope, and more particularly to an atomic force microscope.

STATE OF THE ART

The atomic force microscope (AFM) allows measuring the topography of a surface with a resolution in the nanometer range. In known manner, an AFM comprises a probe, the probe comprising a tip suitable for being positioned facing the surface, for example in contact with the surface and up to several hundred nanometers therefrom. The interaction between the tip and the surface to be evaluated causes a variation in the mechanical properties of the probe. This variation is recorded to evaluate the surface, for example by measuring variations in the reflection of a laser beam on the probe or variations in the electrical properties of a piezoresistive material integrated into the probe.

Many methods have been developed to evaluate the properties of the surface from the probe. Among them, the best known are for example the measurement in contact, non-contact, intermittent contact mode or in frequency or amplitude modulation. The intermittent contact mode consists for example in vibrating the probe at its resonant frequency at a predetermined amplitude. The interaction between the probe tip and the surface causes a variation in the resonant frequency of the probe, thereby a reduction in the amplitude of the vibrations. Various servo-control means allow maintaining the amplitude of the vibrations of the constant probe or the amplitude of the interaction forces between the tip and the constant surface while scanning the surface with the tip in order to evaluate the surface.

When using an AFM microscope, the spatial resolution, in a plane tangent to the surface, is limited by the dimension of the tip. On the other hand, the resolution of a measurement of the interaction force between the tip and the surface is limited by the mechanical properties of the probe.

In a known manner, an AFM probe has a micrometer or millimeter-sized tuning fork shape made for example of quartz. Giessibl et al. (Giessibl, F. J Pielmeier, F., Eguchi, T., An, T., & Hasegawa, Y. (2011), *Comparison of force sensors for atomic force microscopy based on quartz tuning forks and length-extensional resonators, Physical Review B*, 84(12), 125409) describe the use of a micrometric probe, having a bending stiffness of between 500 N·m$^{-1}$ and 3,000 N·m$^{-1}$.

Stowe et al. (Stowe, T. D., Yasumura, K., Kenny, T. W., Botkin, D., Wago, K., & Rugar, D., 1997, Attonewton force detection using ultrathin silicon cantilevers, *Applied Physics Letters*, 71(2), 288-290) describe the minimum force $F_{min}$ that can be measured by a beam-shaped probe by the formula (1):

$$F_{min} = \sqrt{\frac{wt^2}{lQ}} (E\rho)^{(1/4)} (k_B T B)^{(1/2)}$$

where w is the width of the beam, t is the thickness of the beam, l is the length of the beam, Q is the quality factor of the beam, $k_B$ is the Boltzmann constant, T is the temperature and B is the width of the detection bandwidth. Formula (1) directly encourages those skilled in the art to develop the lightest and most flexible probe so as to reduce the detection threshold of the AFM microscope.

However, such probes have the following drawbacks: they are both expensive and fragile. It is common to have to replace the probe of an AFM microscope more than twice when measuring the topography of a surface.

To this end, Canale et al. (Canale, L., Laborieux, A., Mogane, A. A., Jubin, L., Comtet, J., Lainé, A., Bocquet, L., Siria, A. & Nigues, A., 2018, MicroMegascope. *Nanotechnology*, 29(35), 355501) describe an atomic force microscope, comprising a macroscopic probe. The probe comprises a harmonic oscillator of macroscopic size, particularly a tuning fork whose size is greater than 1 cm, on which a tungsten tip is fixedly mounted and intended to be positioned facing the surface to be evaluated. Thus, due to the dimensions of the tuning fork, it is possible to modify the type of tip without modifying the entire structure of the probe. It is also possible to use cheaper probes. In addition, the mass of the probe is higher than that of the probes of the prior art by several orders of magnitude. Thus, the coupling of the probe with macroscopic elements able to measure the position of the probe does not substantially modify the mechanical properties of the probe and the detection performances of the AFM microscope are not deteriorated.

However, the evaluation of a surface in contact with an element other than air, such as vacuum or a liquid medium, can be complex. Indeed, the probe must be at least partly introduced into this medium, which increases the complexity of the design of the microscope and/or causes measurement biases of the surface.

DISCLOSURE OF THE INVENTION

One aim of the invention is to propose a solution for manufacturing an AFM microscope that is simpler than the microscopes of the prior art.

This aim is achieved within the framework of the present invention thanks to an atomic force microscope for evaluating a surface of a sample, comprising:
  a sample holder having a first area adapted to receive the sample fixedly mounted with respect to the first area,
  a probe having a tip suitable for being positioned facing the surface of the sample, the microscope being configured to allow an adjustment of a position of the tip with respect to the surface,
  a support,
  the sample holder having at least one second area distinct from the first area and fixed with respect to the support,
  the sample holder being deformable so as to authorize a relative displacement of the first area with respect to the second area,
  the microscope comprising a detector suitable for detecting a displacement of the first area with respect to the second area.

Since the sample holder allows detecting the interactions between the tip of the probe and the surface of the sample, it is possible to use a probe that does not comprise a sensor and thus simplify the design of the microscope and the evaluation of the surface.

The invention is advantageously supplemented by the following characteristics, taken individually or in any one of their technically possible combinations:
- the sample holder is a harmonic oscillator,
- the detector is fixedly mounted on the sample holder and preferably fixedly mounted on the first area,
- the microscope comprises an actuator configured to vibrate the sample holder at a predetermined frequency,
- the microscope comprises a closed-loop servo-control regulator, the detector being able to transmit a signal representative of a measurement of the displacement of the first area to the regulator and the regulator being able to transmit a regulation signal to the actuator,
- the sample holder has a length greater than 2 mm, in particular greater than 1 cm and preferably greater than 3 cm,
- a bending stiffness of the sample holder between the first area and the second area is greater than $10^3$ N·m$^{-1}$, in particular greater than $10^4$ N·m$^{-1}$ and preferably greater than $10^5$ N·m$^{-1}$,
- the microscope comprises several probes, each probe having a tip and is configured to allow an independent adjustment of each of the positions of the tips with respect to the surface, at least one of the probes being preferably made of a material different from another probe,
- the microscope comprises a cell adapted to contain a liquid medium, the cell being fixedly mounted with respect to the first area and the sample is fixedly mounted on the cell,
- the sample holder comprises several second areas,
- the first area is arranged between two second areas at equal distance from each of the second areas.

Another aspect of the invention is a method for evaluating a surface of a sample by an atomic force microscope according to one embodiment of the invention, comprising the steps of:

a) positioning the tip at a point facing the surface, preferably at a distance of less than 100 nm from the surface and in particular less than 10 nm from the surface, b) measuring the displacement of the first area with respect to the second area by the detector so as to evaluate an interaction between the surface and the tip.

The invention is advantageously supplemented by the following characteristics taken individually or in any one of their technically possible combinations:
- a repetition of the positioning a) and measuring b) steps is implemented at other points facing the surface, and preferably defines a scanning of the surface by the tip,
- the method also comprises a step d) of actuating the sample holder, concomitant with the measuring step b), in which the actuator is actuated so as to vibrate the first area of the sample holder at a predetermined frequency between 500 Hz and 10 MHz,
- the sample holder has at least one natural resonant frequency $f_k$ and preferably a plurality of natural resonant frequencies $f_k$ so as to vibrate the first area at one or several frequencies of between $(f_k-0.5 \cdot f_k)$ and $(f_k+0.5 \cdot f_k)$,
- the actuator is actuated so as to vibrate the first area of the sample holder at several predetermined frequencies.

DESCRIPTION OF THE FIGURES

Other characteristics, aims and advantages of the invention will emerge from the following description which is purely illustrative and not limiting and which should be read in relation to the appended drawings in which.

In all of the figures, similar elements have identical references.

DETAILED DESCRIPTION OF THE INVENTION

General Architecture of the Microscope 1

Figure 1:
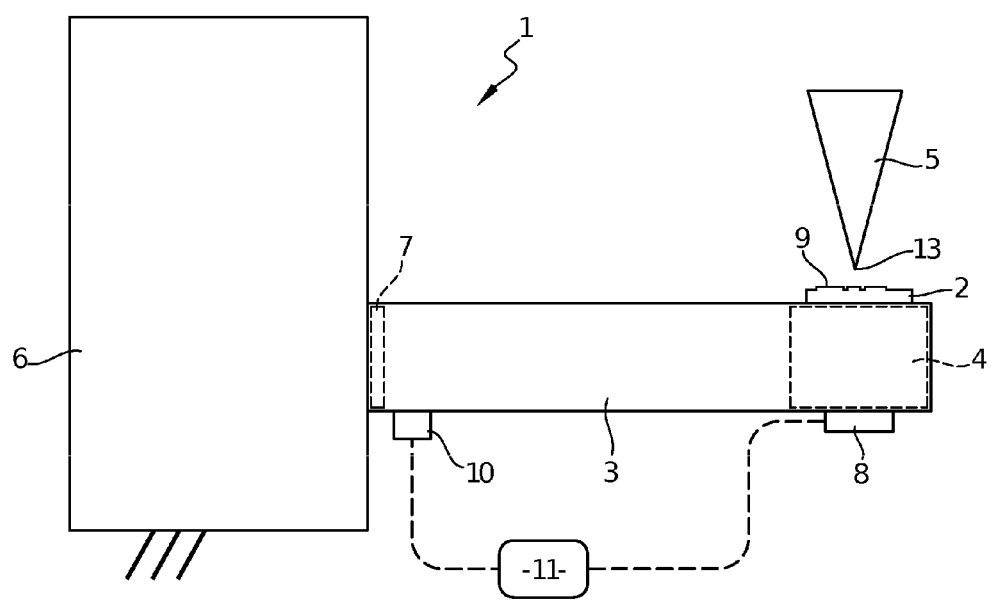
FIG. 1 schematically illustrates an atomic force microscope according to one embodiment of the invention.
Figure 2:
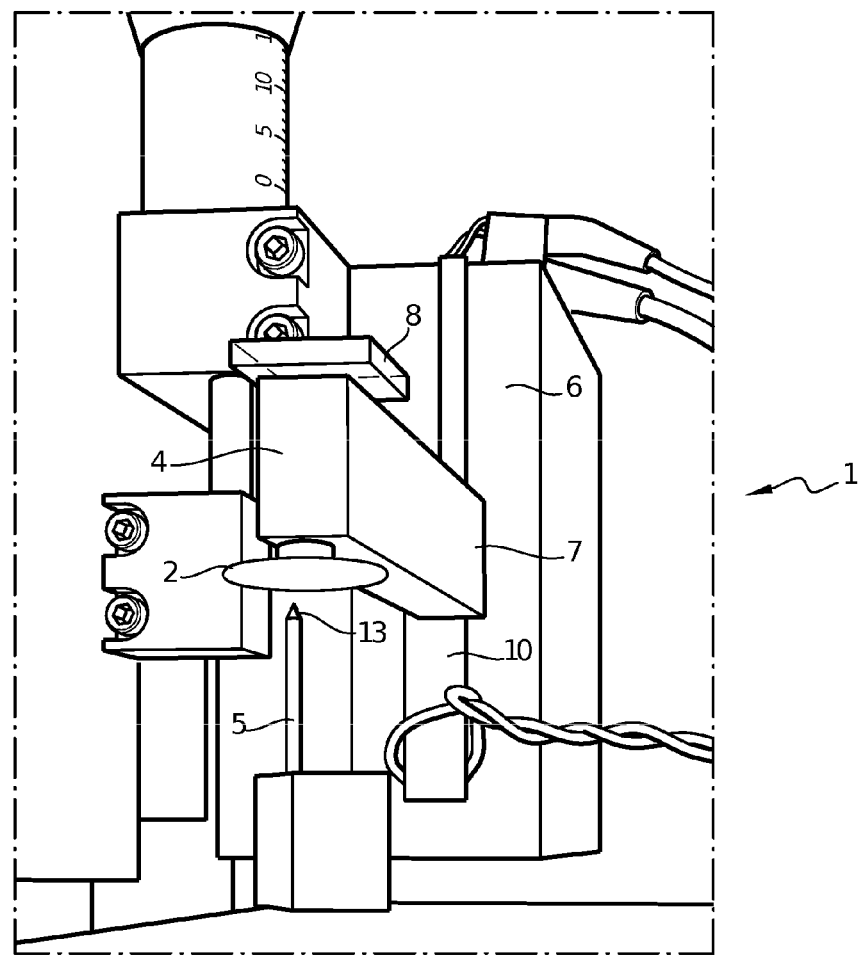
FIG. 2 is a photograph of an atomic force microscope according to one embodiment of the invention.

Referring to FIG. 1 and FIG. 2, the atomic force microscope 1 comprises a sample holder 3. The sample holder 3 supports a sample 2 having a surface 9 to be measured. Particularly, the sample holder 3 comprises at least two distinct areas: a first area 4 and a second area 7. The first area 4 is adapted to receive the sample 2 fixedly mounted with respect to the first area 4. The microscope also comprises a support 6. The support 6 is fixedly mounted on the ground or on the reference frame of the measuring location. The second area 7 is fixedly mounted on the support. The second area 5 can only be made in one piece with the support 6 or welded to the support 6.

The sample holder 3 is deformable so as to authorize a relative displacement of the first area 4 with respect to the second area 7. The part of the sample holder 3 comprised between the first area 4 and the second area 7 can be preferably deformable so that the relative movement of the sample 2 with respect to second area 7 results from a deformation of the whole part of the sample holder 3. Preferably, the bending stiffness of the sample holder 3, and in particular of the part(s) located between the first area 4 and the second area(s) 7, has a bending stiffness greater than $10^3$ N·m$^{-1}$ in particular greater than $10^4$ N·m$^{-1}$ and more preferably greater than $10^5$ N·m$^{-1}$. In addition, the bending stiffness of the sample holder 3 and in particular of the part(s) located between the first area 4 and the second area(s) 7 has a bending stiffness of less than $10^8$ N·m$^{-1}$ is preferably less than $10^7$ N·m$^{-1}$. The sample holder 3 can for example be made of aluminum. Thus, even though the sample holder 3 is deformable, it may have a higher rigidity than that of the probes of the art prior while remaining sufficiently deformable to allow an evaluation of the surface.

The sample holder 3 has at least one macroscopic dimension, that is to say greater than 2 mm in particular greater than 1 cm and preferably greater than 3 cm. The sample holder 3 can for example have the shape of a 7 cm long, 12 mm thick and 7 mm wide aluminum cuboid bar. The first area 4 then corresponds to one of the ends of the bar and the second area 7 corresponds to the other end of the bar, fixedly mounted on the support. At a minimum, the dimensions of sample holder 3 must allow the sample holder to support the sample 2.

The sample holder 3 is preferably a harmonic oscillator. The sample holder 3 can have a natural frequency between 500 Hz and 10 MHz preferably between 1 kHz and 1 MHz. Thus, the measurement of the frequency of the sample holder 3 is not disturbed by a surrounding noise, for example caused by an electrical or acoustic noise. The sample holder 3 has for example a quality factor greater than 10 and preferably greater than 100. For example, the sample holder 3 has a natural frequency of 2 kHz and a quality factor of 100.

The sample holder 3 can also be in the form of a macroscopic sized tuning fork preferably of a length greater than 1 cm. The stem of the tuning fork corresponds to the second area 7 and at least one blade of the tuning fork corresponds to the first area 4. Thus, the quality factor of the sample holder 3 can be maximized compared to a beam-shaped sample holder 3 of the same length.

The microscope 1 also comprises a detector 8 suitable for detecting a displacement of the first area 4 with respect to the second area 7. The second area 7 being fixed with respect to the ground, it may be sufficient for the detector 8 to detect the absolute movement of the first area 4. The detector 8 can be an accelerometer, for example manufactured in MEMS technology, fixedly mounted with respect to part of the sample holder 3 and preferably with respect to the first area 4 of the sample holder 3. Thus, it is possible to maximize the amplitude of the movement of the measured sample holder 3. Alternatively or in addition, the detector 8 can be an optical interferometer, a capacitive detector, a piezoelectric detector, a laser deflection detector and/or a tunneling detector. With reference to FIG. 2, the detector 8 is for example mounted fixedly facing the sample 2 on the first area 4 of the sample holder 3. The movement frequency range detectable by the detector 8 must comprise the natural frequency of the sample holder 3. The detector 8 can advantageously measure movements corresponding to very low amplitude vibrations of the sample holder 3 preferably of an amplitude of less than 1 nm and in particular of an amplitude of less than 500 pm. Thus, it is possible to use a sample holder 3 having a higher rigidity than the probes of the prior art.

Probe

The microscope 1 comprises at least one probe 5. The probe 5 comprises a tip 13 suitable for being positioned facing the surface 9 of the sample. The microscope 1 comprises means for positioning the tip 13 with respect to the surface 9. The probe 5 can for example comprise an electrochemically etched tungsten tip fixedly mounted on means for positioning the tip 13 with respect to a direction tangential to the surface 9, allowing a control of the position having a sub-micrometric accuracy preferably less than 100 pm. Such means can for example comprise a piezoscanner. Unlike the prior art, the probe may not comprise a sensor and thus be passive. Thus, the microscope 1 can preferably comprise a control unit configured to control a fixed position of the tip 13 and at the same time measure a signal emitted by the detector 8.

The microscope 1 can also comprise a plurality of probes 5. The different probes 5 can be installed so as to be interchangeable. Several probes 5 can also be presented concomitantly facing the surface 9. The microscope can for example comprise a rotating table to which various probes 5 are fixed. By way of example, the tip 13 of a probe 5 can be able to experience a repulsive, chemical, magnetic, thermal, ionic, fluidic type interaction and/or a tunneling current. Preferably, at least one of the probes 5 is made of a material different from another probe 5. Each probe 5 can comprise positioning means independent of each other.

The inventors discovered that the sample holder 13 can be used to detect the interactions between the surface 9 and the tip 13 of the probe 5. Indeed, the tip 13 can be brought closer to the surface 9 at a sufficiently small distance, for example between 10 nm and 1 µm, to increase the interaction between the tip 13 and the surface 9 so that the mechanical properties of the sample holder 3 are modified. Thus, unlike the atomic force microscopes of the prior art, in which the sensor forms part of the probe 5 or is fixed thereto, the interactions between the surface 9 and the tip 13 are detected by the sample holder 13. The sample holder 13 is mechanically decoupled from the probe 5. Thus, it is possible to significantly reduce the cost of a probe 5, because the probe 5 does not necessarily comprise a sensor. In addition, the cost of the microscope 1 as a whole can also be reduced, the sample holder 3 being reused for each measurement. Finally, the evaluation of the surface 9 can be implemented in media other than air in a simplified manner: indeed, the manufacture of the sensor no longer has to take into account the dissipation of the energy transmitted to the medium during the movement of the probe 5 in a medium with properties different from air such as a liquid, because the movement allowing the detection of the interaction between the tip 13 and the surface 9 is carried out by the sample holder 3. In addition, even if the medium in contact with the surface 9 is not such as to cause more frictional forces with the probe 5 than air, as it is the case for a partial vacuum, the integration of a probe 5 without sensor in an enclosure adapted to said medium is simplified.

Figure 3:
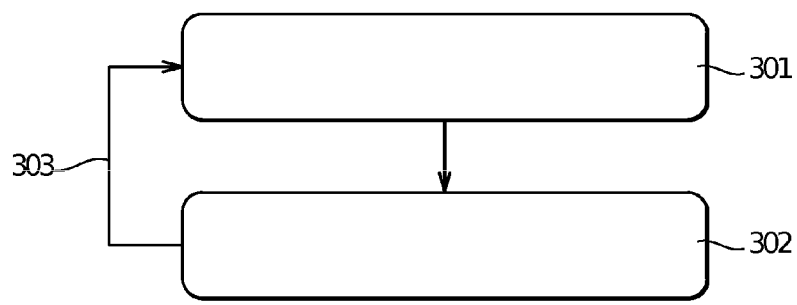
FIG. 3 illustrates a method for evaluating a surface of a sample according to one embodiment of the invention, FIG. 4 schematically illustrates part of a microscope according to one embodiment of the invention suitable for evaluating the surface of a sample in a liquid medium.

Referring to FIG. 3, another aspect of the invention is a method for evaluating the surface 9 by the atomic force microscope 1. The method comprises a step 301 of positioning the tip 13 at a point facing the surface 9, preferably at a distance of less than 100 nm from the surface and in particular less than 10 nm from the surface 9. The method comprises a step 302 of measuring the displacement of the first area 4 of the sample holder 3 by the detector 8 so as to evaluate an interaction between the surface 9 and the tip 13. Thus, the microscope 1 is configured to evaluate an interaction between the surface 9 and the tip 13 from the detector 8. The method preferably comprises the repetition 303 of steps 301 and 302, step 301 being carried out at other points facing the surface 9. The repetition 303 can for example be implemented by scanning the surface 9 to be evaluated by displacement of the tip 13. The scanning can be implemented by repeating steps 301 and 302 at successive points separated for example by a sub-nanometric distance, for example of between 100 µm and 1 nm. The control unit can be configured to calculate an interaction between the surface 9 and the tip 13 at least from the output signal of the detector 8. Preferably, the control unit is configured to calculate an interaction between the surface 9 and tip 13 at least from the output signal of the detector 8 and from a signal representative of the position of the tip 13 with respect to the surface 9.

With reference to FIG. 1 and FIG. 2, the microscope 1 preferably comprises an actuator 10 configured to vibrate the sample holder 3 in a controlled manner and at a predetermined frequency. The actuator 10 can for example be a piezoelectric actuator (or dither) able to vibrate the sample holder 3 at its natural frequency. The actuator 10 can be fixedly mounted on the sample holder 3, for example supported by the second part 7 of the sample holder 3. The method according to one aspect of the invention can comprise a step, for example simultaneous with the step of measuring the displacement of the first area 4, in which the actuator 10 is actuated so as to vibrate the first area 4 of the sample holder 3 at a predetermined frequency of between 500 Hz and 10 MHz. For a natural resonant frequency $f_0$ of the sample holder 3, the actuator 10 is preferably actuated so as to vibrate the first area 4 at a frequency of between $f_0$−0.5·$f_0$ and $f_0$+0.5·$f_0$, in particular between $f_0$−0.1·$f_0$ and $f_0$+0.1·$f_0$. Thus, it is possible to measure a variation in the amplitude of the vibrations of the first area 4 or in the frequency of the vibrations of the first area 4 during an interaction between the surface 9 and the tip 13. The actuator 10 allows controlling the deformation of the first area 4 with respect to the second area 7. The control unit can be connected to the actuator 10 and be configured to control the actuator 10 so as to control the deformation of the first area 4 with respect to the second area 7 and at the same time to receive the output signal from the detector 8 so as to calculate an interaction between the surface 9 and the tip 13 of the probe.

The actuation of the first area 4 can also be implemented at several predetermined frequencies. It is thus possible to evaluate the behavior of a sample 2 under a stress at different frequencies or speeds.

The microscope 1 can also comprise a regulator 11 by a closed-loop servo-control. A signal representative of the displacement of the first area 4 can be transmitted by the detector 8 to the regulator 11. The regulator 11 can then transmit a regulation setpoint to the actuator 10 and/or to the means for positioning the tip 13 so to regulate the interactions between the tip 13 and the surface 9.

The microscope 1 preferably comprises a tip positioning actuator for positioning the tip 13 of the probe 5 facing the surface 9. The tip positioning actuator can be a piezomotor. The regulator 11 may be adapted to transmit a regulation signal to the tip positioning actuator so as to maintain the tip 13 at a constant and predetermined distance from the average surface 9 over time.

Configurations of the Sample Holder 3

The quality factor (defined by the ratio between the resonant frequency and the width of the Lorentzian resonance at half height) can be controlled by the shape of the used sample holder 3. Particularly, the sample holder 3 can have the shape of a beam fixedly mounted at its two ends on the support 6 by the second areas 7. The first area 4 is then arranged in the middle of the beam, at an equal distance from each of the second areas 7. Thus, the quality factor of the sample holder 3 can be maximized. The sample holder 3 can also be in the form of a membrane.

In this case, the first area 4 is arranged at the center of the membrane and the second area 7 is arranged at the edge of the membrane.

Measurement in a Liquid Medium

Figure 4:
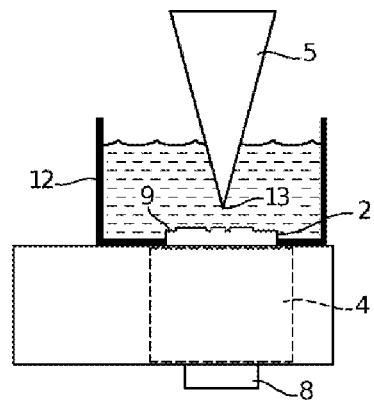

The microscope 1 is particularly advantageous to implement measurements of a surface 9 in a liquid medium. With reference to FIG. 4, the microscope 1 can comprise a cell 12. The cell 12 is adapted to contain a liquid or gelled medium. The cell 12 is fixedly mounted on the first area 4. The sample is fixedly mounted on the cell 12. By integrating the sensor into the sample holder 3, the measurement of a surface 9 in a liquid medium is simplified. Indeed, it is not necessary for the probe 5, comprising the tip 13, to oscillate. Thus, the measurement is not affected by any frictional forces which can be exerted by the liquid medium on the probe 5 during the evaluation of the surface 9, as it is the case in the microscopes of the prior art. This type of configuration is particularly advantageous for the evaluation of biological objects attached to the surface 9. In addition, since the detector 8 is not mounted in a submerged probe 5, it is possible to avoid a drift of the output signal of the detector 8. Indeed, the sample holder 3 and the detector 8 can be kept out of contact with the liquid medium.

Result of a Surface Measurement 9

Figure 5:
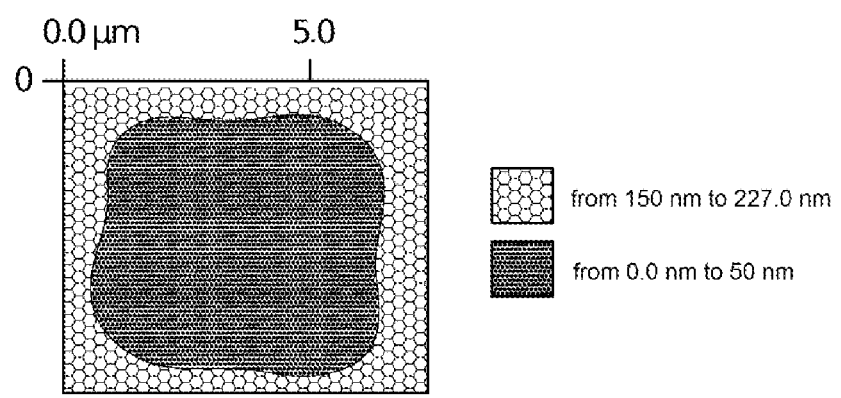
FIG. 5 is an image of a surface measured by an atomic force microscope according to one embodiment of the invention.

With reference to FIG. 5, the surface 9 of a silicon oxide calibration network is measured by the microscope 1 according to the embodiment illustrated in FIG. 2. The pitch of the network is equal to 5 μm and the depth of the blind hole is equal to 100 nm (calibration network).

The invention claimed is:

1. An atomic force microscope for evaluating a surface of a sample, comprising:
   a sample holder comprising a first area configured to receive the sample fixedly mounted with respect to the first area,
   a probe comprising a tip configured to be positioned facing the surface of the sample, the microscope being configured to allow an adjustment of a position of the tip with respect to the surface,
   a support,
   wherein
   the sample holder has at least a second area distinct from the first area and fixed with respect to the support, the sample holder being deformable so as to authorize a relative displacement of the first area with respect to the second area,
   the microscope comprises a detector configured to detect a displacement of the first area with respect to the second area,
   the microscope being configured to evaluate an interaction between the surface and the tip base on a measurement of the displacement of the first area of the sample holder by the detector.

2. The atomic force microscope according to claim 1, wherein the sample holder is a harmonic oscillator.

3. The atomic force microscope according to claim 1, wherein the detector is fixedly mounted on the sample holder.

4. The atomic force microscope according to claim 3, wherein the detector is fixedly mounted on the first area.

5. The atomic force microscope according to claim 1, comprising an actuator configured to vibrate the sample holder at a predetermined frequency.

6. The atomic force microscope according to claim 1, comprising a closed-loop servo-control regulator, the detector being configured to transmit to the regulator a signal representative of a measurement of the displacement of the first area and the regulator being configured to transmit a regulation signal to the actuator.

7. The atomic force microscope according to claim 1, wherein the sample holder has a length greater than 2 mm.

8. The atomic force microscope according to claim 7, wherein the sample holder has a length greater than 1 cm.

9. The atomic force microscope according to claim 8, wherein the sample holder has a length greater than 3 cm.

10. The atomic force microscope according to claim 9 wherein the bending is greater than 105 N·m−1.

11. The atomic force microscope according to claim 1, wherein a bending stiffness of the sample holder between the first area and the second area is greater than 103 N·m−1.

12. The atomic force microscope according to claim 11 wherein the bending is greater than 104 N·m−1.

13. The atomic force microscope according to claim 1, comprising several probes, each probe having a tip, the microscope being configured to allow an independent adjustment of each of the positions of the tips with respect to the surface.

14. The atomic force microscope according to claim 13 wherein at least one of the probes is made of a material different from another probe.

15. The atomic force microscope according to claim 1, comprising a cell configured to contain a liquid medium.

16. The atomic force microscope according to claim 15 wherein the cell is fixedly mounted with respect to the first area and the sample is fixedly mounted on the cell.

17. The atomic force microscope according to claim 1, wherein the second area is one among a plurality of second areas comprised in the sample holder.

18. The atomic force microscope according to claim 17 wherein the first area is arranged between two second areas among the plurality of second areas, the first area being at equal distance from each of the two second areas.

19. A method for evaluating a surface of a sample by an atomic force microscope according to claim 1, comprising the steps of:
  a) positioning the tip so as to face the surface,
  b) measuring the displacement of the first area with respect to the second area by the detector so as to evaluate an interaction between the surface and the tip.

20. The method according to claim 19, wherein the repetition of steps a) and b) defines a scanning of the surface by the tip.

21. The method according to claim 19 further comprising a step d) of actuating the sample holder, concomitant with the measurement step b), wherein the actuator is actuated so as to vibrate the first area of the sample holder at a predetermined frequency between 500 Hz and 10 MHz.

22. A method for evaluating a surface of a sample according to claim 21, wherein the actuator is actuated so as to vibrate the first area of the sample holder at several predetermined frequencies.

23. The method according to claim 21, wherein the sample holder has at least one natural resonant frequency $f_k$, so as to vibrate the first area at a frequency of between $(f_k - 0.5 \cdot f_k)$ and $(f_k + 0.5 \cdot f_k)$.

24. The method according to claim 19, wherein step a) is performed so as to position the tip at a distance of less than 100 nm from the surface.

25. The method according to claim 24, wherein the distance is less than 10 nm from the surface.

* * * * *